July 17, 1956  R. E. BAUMHECKEL  2,755,113
BEARING SEAL
Filed Sept. 15, 1952
Fig. 1.
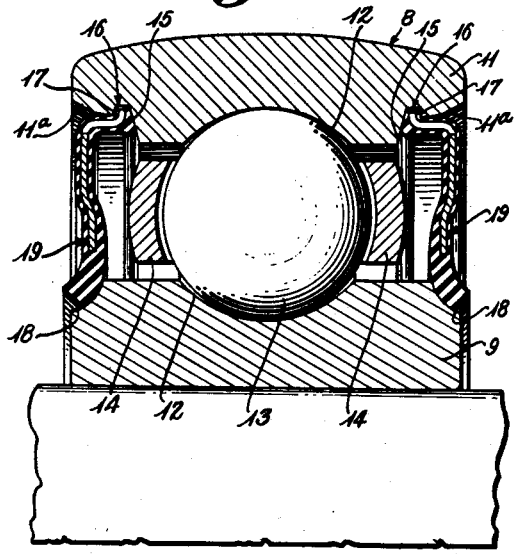
Fig. 2.
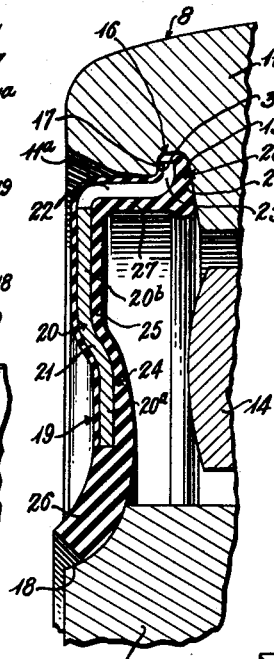
Fig. 3.
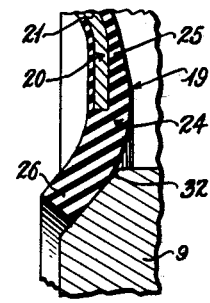
Fig. 4.
Fig. 5.
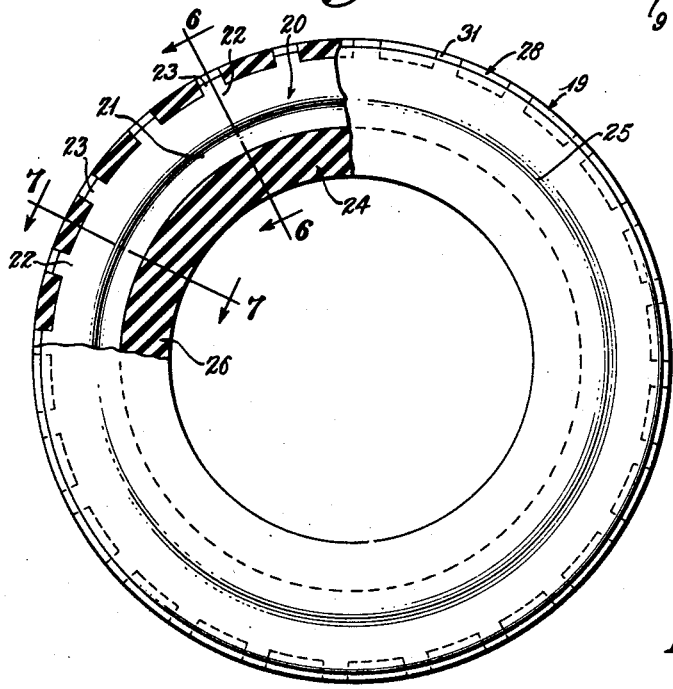
Fig. 6.  Fig. 7.
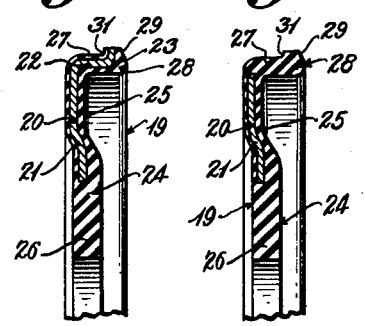
INVENTOR
*Ralph E. Baumheckel*
BY *L. Donald Myers*
ATTORNEY

United States Patent Office 2,755,113
Patented July 17, 1956

2,755,113
BEARING SEAL

Ralph E. Baumheckel, Connersville, Ind., assignor to Link-Belt Company, a corporation of Illinois Application September 15, 1952, Serial No. 309,719

10 Claims. (Cl. 286—5)

This invention relates to new and useful improvements in bearing seals and deals more particularly with lip-type seals for bearing units.

Certain types of prior seals for bearings have their peripheral margins positioned in circumferential grooves formed in the outer race rings of the bearings and extend into sealing engagement with the inner race rings. To be effective in preventing the egress of lubricant and the ingress of foreign matter, the seals must also be maintained in sealing engagement with the grooves in which they are mounted and this has been accomplished by tightly fitting their peripheral portions in the grooves.

Seal parts which are so mounted with a positive metal-to-metal contact have the distinct disadvantage that the coacting metal parts must both be held to very close tolerances as to size and out of roundness to prevent seal looseness or outer ring distortion. This disadvantage is made worse by the fact that the outer ring may change shape during heat treatment. Subsequent grinding of the ring periphery makes the outside diameter round again, but the unground grooves are still out of round. When the round seal parts are thereafter pressed into the grooves, they will tend to force the latter back into a round condition thereby distorting the outside diameter of the outer ring. Further, it has been difficult to remove seal members that are so mounted without damaging the members to such as extent that they cannot be reused.

It is the primary object of this invention to provide a seal for bearings which may be easily and quickly assembled and disassembled relative to its race ring mounting groove without damaging the seal.

A further important object of the invention is to provide a seal for bearings which is secured to its associated race ring mounting grooves by a plurality of circumferentially spaced, resilient peripheral members.

Still another object of the invention is to provide a seal for bearings which is provided with a peripheral margin formed of resilient material that is urged into sealing engagement with its race ring mounting groove by spring members embedded in the material to permit rapid and easy removal and replacement of the seal without damage.

A further object of the invention is to provide a bearing seal having its peripheral margin formed with a plurality of circumferentially arranged spring members supporting a bead of resilient material in sealing engagement with an associated race ring mounting groove without distorting the race ring.

A further object of the invention is to provide a bearing seal which, when properly positioned in its associated race ring mounting groove, does not extend beyond the boundary dimensions or require changes in any of the dimensions of a standard bearing, and which affords adequate clearance between the retainer for the antifriction elements and the seal parts.

A still further object of the invention is to provide a bearing seal which will adjust itself to maintain sealing engagement with the inner and outer race rings of its associated bearing despite limited axial movement of one ring relative to the other.

Other objects and advantages of the invention will be apparent during the course of the following description.

In the accompanying drawing forming a part of this specification and in which like reference characters are used to designate like parts throughout the same, Figure 1 is a transverse sectional view of an antifriction bearing which is provided with a pair of seals embodying the invention.

Figure 2 is an enlarged fragmentary sectional view taken on the same plane as the illustration of Fig. 1, Figure 3 is an enlarged, fragmentary sectional view showing a modification of the surface of the inner race ring with which the seal cooperates.

Figure 4 is a similar view to Fig. 3 showing a further modification.

Figure 5 is an elevational view, partly broken away, of an unmounted seal embodying the invention.

Figure 6 is a sectional view taken on line 6—6 of Fig. 5, and

Figure 7 is a sectional view taken on line 7—7 of Fig. 5.

In the drawings, wherein for the purpose of illustration are shown the preferred embodiments of the invention, and first particularly referring to Figs. 1 and 2, reference character 8 designates an antifriction bearing having concentric inner and outer race rings 9 and 11, respectively, which are provided with raceways 12 in their opposed surfaces for accommodating a plurality of balls 13 held in circumferentially spaced relationship by the retainer or cage 14 in a conventional manner. Spaced laterally from each edge of the raceway 12 in the outer race ring 11 is an outwardly facing shoulder 15 which is radially inclined and forms one side wall of the seal mounting groove 16. The opposing, inwardly facing side wall 17 of the groove is radially arranged and of a lesser width than the side wall 15. The inner surface 11a of the race ring 11 between each groove wall 17 and the adjacent side of the race ring is beveled to facilitate mounting of the seal in the groove 16, as will be later described.

At the opposite edges of its periphery, the inner race ring 9 is provided with circumferentially extending, arcuate sealing surfaces 18 which are positioned axially outwardly of the seal mounting grooves 16 of the outer race ring 11.

Mounted in each one of the grooves 16 of the outer race ring 11 is a seal 19 which extends across and closes the space between the inner and outer race rings 9 and 11, respectively. The two seals 19 are of identical construction and the following description of one will suffice for both.

As illustrated in the several figures, the seal 19 includes an annular stiffening ring 20 which may be formed of metal, or other similar material. The main body of the ring is continuous and is so shaped as to have inner and outer, radially arranged flange portions 20a and 20b, respectively, which are connected in offset or parallel relationship by the intermediate, reversely bent portion 21. Spaced circumferentially of and formed integrally with the periphery of the outer flange portion 20b of the stiffening ring are a plurality of laterally or axially extending spring fingers 22 which have their outer end portions bent radially outwardly to form hooks 23.

The stiffening ring 20 is encased in a seal ring 24 that is molded of rubber, or any similar resilient material, that will not be affected by the bearing lubricant. The main body portion 25 of the seal ring substantially conforms in shape with the portions 20a, 20b and 21 of the stiffening ring 20, while a normally flat, resilient lip 26, of increased thickness, extends radially inwardly from the edge of the inner flange portion 20a. The angularly arranged portion 27 of the seal ring 24 which encases the spring fingers 22, is continuous circumferentially of the seal and, consequently, bridges the spaces between the fingers. The free edge portion 28 of the seal ring which is associated with the hooks 23 of the spring fingers is enlarged to form a circumferentially extending mounting bead having an end face 29 which is inclined toward the ends of the hooks so that the axial thickness of the mounting bead will be greater than the width of the race ring mounting groove in which the seal 19 is to be secured. The mounting bead 28, also, is formed with a radial surface 31 on its side opposite to the inclined end face 29.

Referring to Fig. 2 for a detail description of the manner in which each seal 19 is secured in its mounting groove 16, the seal is placed adjacent the bearing 8 with its angular portion 27 extending toward the interior of the bearing and with the surface 29 of the mounting bead 28 in engagement with the internal beveled surface 11a of the outer race ring 11 which is adjacent the groove 16. The seal 19 is thereafter pressed axially toward the groove 16 with the mounting bead 28 and the embedded hooks 23 being deflected radially inwardly by the inclined surface 11a until the mounting bead is in alinement with the groove. The resiliency of the spring fingers 22 will thereupon cause the hooks 23 and the mounting bead 28 to snap into the groove 16 with the inclined face 29 in sealing engagement with the inclined side wall 15 of the groove and with the radial surface 31 in sealing engagement with the radial side wall 17 of the groove. It will be noted that the resilient mounting bead 28 is compressed between the hooks 23 and the side wall 15 of the groove 16 so that the aforementioned sealing engagement between the seal 19 and groove will be properly maintained at all times. The portion of the mounting bead 28 between the hooks 23 and the radial side wall 17 of the groove is also compressed, so that the hooks cooperate with the radial wall to retain the seal 19 in the groove.

When the seal 19 is seated in its mounting groove 16, as described above, the resilient lip 26 of the seal ring 24 will engage and be deflected by the arcuate sealing surface 18 of the inner race ring 9. The resiliency of the material from which the seal ring 27 is formed will constantly maintain this sealing engagement between the lip 26 and sealing surface 18 despite limited axial movement of the race rings 9 and 11 relative to each other. The seal 19, therefore, will prevent the egress of lubricant from the space between the race rings 9 and 11, or the ingress of foreign matter into the space by tight sealing engagement with the groove 16 and by rubbing engagement with the sealing surface 18.

The seal 19 may be quickly and easily removed from its seated position in the groove 16 by insertion of a suitable tool between the beleveled surface adjacent the groove and the shoulder 27 so that the spring fingers 22 may be deflected radially inwardly to release the hooks 23 from the groove. It will also be noted that the metallic stiffening ring 20 is exposed only at the bottom of the groove 16 so that it is not subject to corrosion, or other deteriorating action.

In that modification of the invention illustrated in Fig. 3, the edge of the inner race ring 9 is beveled to provide a radially inclined plane sealing surface 32 in the shape of a frustum of a cone. The remainder of the seal and bearing structure is identical to that illustrated in Fig. 2 and the resilient lip 26 of the seal ring 24 cooperates with the surafce 32 in the same manner as was previously described in connection with Fig. 2. Corresponding portions of the modification of the invention illustrated in Fig. 3 and that illustrated in Fig. 2 have been given the same reference characters and will not be described in detail.

Fig. 4 illustrates a further modification of the invention in which the resilient lip 26 of the seal 19 engages a cylindrical sealing surface 33 and is deflected into an axially extended position by such engagement. Such an arrangement of the seal 19 permits its use in connection with bearings having inner race rings 34 which extend axially outwardly beyond the sides of the outer race ring 11. The remainder of the seal structure is identical to that illustrated in Figs. 2 and 3, and corresponding reference characters have been assigned to the corresponding parts of each.

It is to be understood that the forms of this invention herein shown and described are to be taken as the preferred examples of the same, and that various changes in the shape, size and arrangement of parts may be resorted to without departing from the spirit of the invention or the scope of the subjoined claims.

Having thus described the invention, I claim:

1. A bearing seal, comprising a stiffening ring and a resilient seal ring encasing said stiffening ring, said stiffening ring having a main body portion and a plurality of laterally extending spring fingers spaced circumferentially around the periphery of said main body portion, said spring fingers having their free end portions bent radially outwardly to form a circumferentially aligned row of hooks, said seal ring having a continuous resilient lip extending radially inwardly of the main body portion of the stiffening ring, a continuous angularly arranged portion which encases said spring fingers and bridges the spaces between adjacent fingers, and a mounting bead having radially outwardly converging sealing surfaces on laterally opposed sides of said hooks and extending circumferentially of the free edge of said angularly arranged portion.

2. The combination with a pair of relatively rotatable members held in radially spaced coaxial relationship, the outer of said members having an inwardly opening circumferential groove with its side walls converging toward the bottom of the groove, of a seal for closing the space between said members, comprising a stiffening ring and a resilient seal ring encasing said stiffening ring, said stiffening ring having a main body portion spaced radially outwardly from the inner rotatable member and a plurality of spring fingers spaced circumferentially around and extending laterally from the peripherally of said body portion, said spring fingers having their free end portions bent radially outwardly to form a plurality of hooks adapted to enter said groove, said seal ring having a continuous resilient lip extending radially inwardly from the main body portion of said stiffening ring into sealing engagement with the inner rotatable member and a continuous angularly arranged portion which encases, and bridges the spaces between adjacent spring fingers and their hooks, the part of said angularly arranged portion which encases said hooks being urged into sealing engagement with the side walls of said groove by the spring fingers.

3. The combination with a pair of relatively rotatable members held in radially spaced coaxial relationship, the outer of said members having an inwardly opening circumferential groove with its side walls converging toward the bottom of the groove of a seal for closing the space between said members, comprising a stiffening ring and a resilient seal ring encasing said stiffening ring, said stiffening ring having a main body portion spaced radially outwardly from the inner rotatable member and a mounting portion formed of a plurality of spring fingers spaced circumferentially around and extending laterally from the periphery of said body portion with their laterally offset free end portions extending radially in alignment with said groove, said seal ring having a continuous resilient lip extending radially inwardly from the main body portion of the stiffening ring into sealing engagement with the inner rotatable member, a continuous angularly arranged portion which encases said spring fingers and bridges the spaces between adjacent fingers, and a mounting bead extending circumferentially of and radially outwardly from said angularly arranged portion to be stiffened by the radially extending free ends of said spring fingers, said mounting bead being urged into sealing engagement with the side walls of said groove by the spring fingers.

4. The combination with a pair of relatively rotatable members held in radially spaced coaxial relationship, the outer of said members having an inwardly opening circumferential groove with its side walls converging toward the bottom of the groove, of a seal for closing the space between said members, comprising a stiffening ring and a resilient seal ring encasing said stiffening ring, said stiffening ring having a main body portion spaced radially outwardly from the inner rotatable member and a plurality of spring fingers spaced circumferentially around and extending laterally from the periphery of said body portion, said spring fingers having their free end portions bent radially outwardly to form a plurality of hooks adapted to enter said groove, said seal ring having a continuous resilient lip extending radially inwardly from the main body portion of said stiffening ring into sealing engagement with the inner rotatable member, a continuous angularly arranged portion which encases said spring fingers and bridges the spaces between adjacent fingers, and a mounting bead associated with said hooks and extending circumferentially of the free edge of said angularly arranged portion for sealing engagement with the side walls of said groove.

5. A seal between two relatively rotatable members, comprising a stiffening ring and a resilient seal ring encasing and stiffening ring, said stiffening ring having an annular main body portion and a plurality of spring fingers spaced circumferentially of the periphery of the main body portion, the major portions of the lengths of said spring fingers extending axially of the main body portion so as to collectively form a resilient mounting portion extending angularly from said body portion, and the free end portions of said spring fingers extending radially outwardly so as to collectively form a circumferentially aligned row of hooks for said mounting portion which is offset axially of and in a plane parallel to the main body portion, said mounting portion resiliently resisting radially inwardly directed compressive forces applied to its offset row of hooks so as to bind the seal through said hooks in a mounted position when forced into one of said relatively rotatable members, said resilient seal ring having a lip extending radially inwardly of the inner edge of the stiffening ring to have freely flexible sealing engagement with a surface of the other of said members, the portion of the resilient seal ring that encases the spring fingers extending axially with the major portions of the lengths of said fingers and radially outwardly with the free end portions of the fingers and being continuous to bridge the spaces between adjacent fingers, and the portion of the resilient seal ring that encases the free end portions of the spring fingers forming a bead projecting radially of the axially extending portion of the resilient seal ring to form a shoulder facing toward the last mentioned portion of the resilient seal ring.

6. A bearing seal as defined in claim 5 further characterized by the said bead having radially outwardly converging surfaces on laterally opposite sides of the free end portions of the spring fingers.

7. The combination with a pair of relatively rotatable members held in radially spaced coaxial relationship, the outer of said members having an inwardly opening circumferential groove formed in its surface which opposes the inner member with the side walls of the groove converging toward the bottom of the groove, of a seal for closing the space between said members, comprising a stiffening ring and a resilient seal ring encasing said stiffening ring, said stiffening ring having a annular main body portion spaced radially outwardly from the inner rotatable member and a plurality of spring fingers spaced circumferentially of the periphery of the main body portion, the major portions of the lengths of said spring fingers extending axially of the main body portion so as to collectively form a resilient mounting portion arranged concentric with and relatively closely positioned to the grooved surface of the outer member, and the free end portions of said spring fingers extending radially outwardly so as to collectively form a circumferentially aligned row of hooks for said mounting portion which is offset axially of and in a plane parallel to the main body portion to be radially aligned with the groove in the outer member, said mounting portion resiliently resisting radially inwardly directed compressive forces applied to the seal ring encased offset row of hooks so as to bind the seal to the outer member when said hooks are forced into the groove of said member, said resilient seal ring having a lip extending radially inwardly of the inner edge of the stiffening ring to have freely flexible sealing engagement with a surface of the inner member.

8. A bearing seal as defined in claim 7 further characterized by the portion of the resilient seal ring that encases the spring fingers extending axially with the major portions of the lengths of said fingers and radially outwardly with the free end portions of said fingers and being continuous to bridge the spaces between adjacent fingers.

9. A bearing seal as defined in claim 8 further characterized by the portion of the resilient seal ring that encases the free end portions of the spring fingers forming a radially projecting bead.

10. A bearing seal as defined in claim 9 further characterized by the said bead having radially outwardly converging surfaces on its outer sides to engage the converging side walls of the said groove.

References Cited in the file of this patent

UNITED STATES PATENTS

| | | |
|---|---|---|
| Re. 21,584 | Brodin | Oct. 1, 1940 |
| 2,044,380 | Cobb | June 16, 1936 |
| 2,182,226 | Geise | Dec. 5, 1939 |
| 2,310,607 | Batesole | Feb. 9, 1943 |
| 2,352,784 | Geyer | July 4, 1944 |
| 2,467,049 | Peterson | Apr. 12, 1949 |
| 2,483,988 | Victor | Oct. 4, 1949 |
| 2,650,117 | Chambers | Aug. 25, 1953 |
| 2,692,786 | Reynolds | Oct. 26, 1954 |
| 2,720,404 | Saywell | Oct. 11, 1955 |

FOREIGN PATENTS

| | | |
|---|---|---|
| 541,336 | Great Britain | Nov. 24, 1941 |
| 978,288 | France | Nov. 22, 1950 |